United States Patent [19]

Doat

[11] Patent Number: 4,911,482
[45] Date of Patent: Mar. 27, 1990

[54] BALL JOINT

[75] Inventor: Jean Doat, Meulan, France

[73] Assignee: ACC La Jonchere, Compiegne, France

[21] Appl. No.: 294,055

[22] Filed: Jan. 5, 1989

[30] Foreign Application Priority Data

Jan. 5, 1988 [FR] France .................... 88 00227

[51] Int. Cl.$^4$ .................... F16L 21/00; F16L 51/02
[52] U.S. Cl. .................... 285/226; 285/910; 285/923; 277/DIG. 6
[58] Field of Search .............. 285/226, 299, 300, 301, 285/910; 277/DIG. 6

[56] References Cited

U.S. PATENT DOCUMENTS

| | | | |
|---|---|---|---|
| 3,574,354 | 4/1971 | Mischel | 285/226 X |
| 4,075,114 | 2/1978 | Ishikawa et al. | 277/DIG. 6 X |
| 4,165,107 | 8/1979 | Affa et al. | 285/226 X |
| 4,516,782 | 5/1985 | Usher | 285/910 X |
| 4,659,117 | 4/1987 | Holzhausen et al. | 285/226 X |
| 4,729,656 | 3/1988 | Churchill et al. | 356/312 |

Primary Examiner—Randolph A. Reese
Assistant Examiner—Arlen L. Olsen
Attorney, Agent, or Firm—Herbert Dubno

[57] ABSTRACT

The flexible ball joint is provided with a continuous ring mounted inside a casing and supported by an inner spherical surface of one of the segments of the casing and by a cylindrical portion of an end piece element. The respective contacting sides of the ring are concentric with the juxtaposed spherical and cylindrical surfaces, so that the ring is able to be slidably guided by those surfaces in response to an absorbing shock without losing the contact with the surfaces.

8 Claims, 1 Drawing Sheet

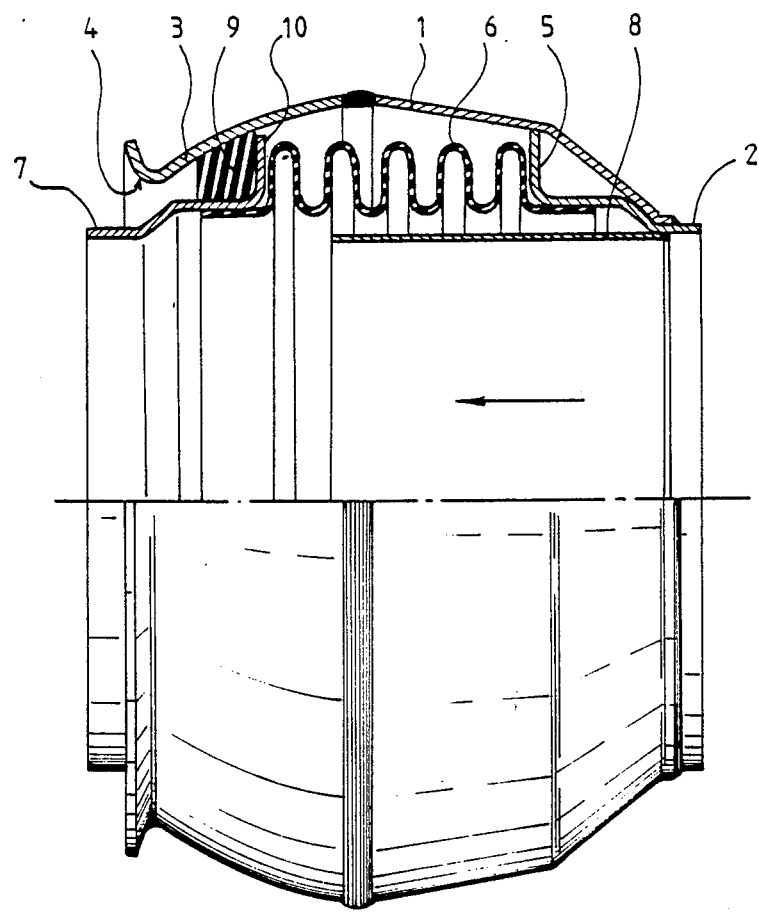

BALL JOINT

BACKGROUND OF THE INVENTION

The present invention relates to a ball-joint for connecting together two pipes having closely related diameters and allows angular movement without a preferential axis, while causing only a small increase in the diameter of the pipe.

It relates more particularly to a joint of this type which comprises two connecting end pieces joined together by a metal bellows, one of the end pieces being secured to a spherical segment against the concave inner face of which an element carried by the other end piece slidingly bears. A joint of this kind is described in the French patent 2 409 442 and corresponding U.S. Pat. No. 4,165,107.

It relates to a joint of this kind in which double sealing is provided.

SUMMARY OF THE INVENTION

The joint of the invention is characterized in that said element is formed by a continuous ring whose outer face is convex, self-lubricating and bears slidingly against the inner face of the spherical segment and which is mounted free on said other end piece, the latter having a shoulder or collar preventing the ring from being separated from said other end piece.

The ring may be made from graphite; it may also be made from metal, its external face having a graphite coating.

BRIEF DESCRIPTION OF THE DRAWING

One embodiment of the ball-joint of the invention will be described hereafter by way of non-limitative example, with reference to the single FIGURE of the accompanying drawing which shows the joint half in axial section and half in elevation.

DESCRIPTION OF THE PREFERRED EMBODIMENT

Such as it is shown in the drawing, the ball-joint of the invention comprises a casing 1 which has the approximate shape of a truncated cone open at both ends. The smallest diameter end of this casing is fitted on and fixed to an end piece 2 whereas its other end is welded to the spherical segment 3 whose outer face is concave and which forms the outer element of the ball-joint. This segment is machined accurately from metal of small thickness and is made rigid by a circular rib 4 providing good mechanical and geometrical resistance of the ball-joint.

End piece 2 has a collar 5 in contact with the casing 1 and is connected by a metal bellows 6 to an end piece 7 inside segment 3. End piece 2 is secured to an inner tube 8 which extends into bellows 6. This tube improves the gas flow in the direction going from end piece 2 to end piece 7 and protects the corrugations of bellows 6.

A continuous annular graphite element 9 is mounted freely on a cylindrical surface of end piece 7 and is prevented by a collar 10 of this end piece from being separated therefrom. The element's outer face is convex, having the same radius as the internal face of segment 3; this annular element is in contact with segment 3 and forms the inner element of the ball-joint while providing centering of end piece 7 at the same time. It is machined from an electrographite bar and thus has good temperature resistance and a high modulus of elasticity.

Segment 3, collar 5 and collar 10 have a thickness such that they form, for the annular element 9, the shock absorbing elements of a suspension whose driving force is the bellows 6 actuated by the thermal and pneumatic effects of the flow of gases conveyed.

During use of the joint which has just been described, the pressurization and the temperature at which the assembly is heated rapidly so as to cause running in of the torus 9 and correct application thereof against segment 3, as well as taking up the play caused by wear. The good heat conductivity of torus 9 and its expansion coefficient, compatible with that of segment 3, allow the assembly to keep correct geometry and control the leak flow which might appear following accidental breakage of the bellows. In the case of breakage of ring 9, no projecting element can damage the bellows 6 which thus guards its sealing function, even should it spread out outside the ball-joint.

Should the bellows 6 break, the pressure of the fluid in the connection is exerted on collar 10; the force which is exerted on this collar is transmitted to ring 9 which is thus jammed between segment 3 and the cylindrical surface of end piece 7. Sealing is thus provided between collar 10 and ring 9, between this ring and segment 3, and between said ring and end piece 7. The connection remains therefore sealed.

What is claimed is:

1. A ball joint for flexibly joining respective ends of joining pipes together, comprising:
    a first end piece operatively connected with an end of one of the pipes;
    a second end piece spaced from said first end piece and connected with an end of the other pipe, said second end piece being formed with a cylindrical portion thereof running into a collar turned away from said cylindrical portion and facing said first end piece;
    a metal bellows connecting said first end piece and said second end piece;
    a casing formed with at least two annular segments connected with one another, one of said segments being operatively connected with said first end piece, the other segment of the casing having a spherical concave inner surface surrounding said second end piece, said inner spherical surface of said other segment being spaced from said cylindrical portion of said second end piece, and
    a continuous ring on said cylindrical surface and free to move thereon, said ring being formed with:
        an outer convex side of graphite in continuous contact with and slidably guided on said inner spherical surface of said other segment,
        a front side abutted by the collar of said second end piece, and
        an inner cylindrical side juxtaposed with said cylindrical portion of said second end piece, said continuous ring being in continuous sealing contact with said spherical segment and said cylindrical portion, so that said ring reacts to the change of the pressurization and of the temperature of the ball-joint by slidably expanding against said spherical surface and cylindrical portion providing said continuous contact therewith.

2. The ball-joint as claimed in claim 1, wherein said ring is mounted free on said cylindrical surface of said other end piece.

3. The ball-joint as claimed in claim 1, wherein said ring is made from an electrographite bar.

4. The ball joint as claimed in claim 1, wherein said one segment of said casing has a generally truncated cone shape, said first end piece being rigidly fixed to said one segment by one of ends thereof.

5. The ball joint as claimed in claim 4, wherein said first end piece has a collar on the end spaced from said one of the ends of the first end piece, said collar being operatively connected with the casing.

6. The ball-joint as claimed in claim 1, wherein said first end piece is secured to an inner tube which extends into the bellows.

7. The ball-joint as claimed in claim 6, wherein said segment, said collar and said shoulder have a thickness such that they form shock absorbing elements for said annular element.

8. The ball joint defined in claim 1 wherein said spherical segment of said casing is provided with a circular rib turned away from said second end piece.

* * * * *